UNITED STATES PATENT OFFICE.

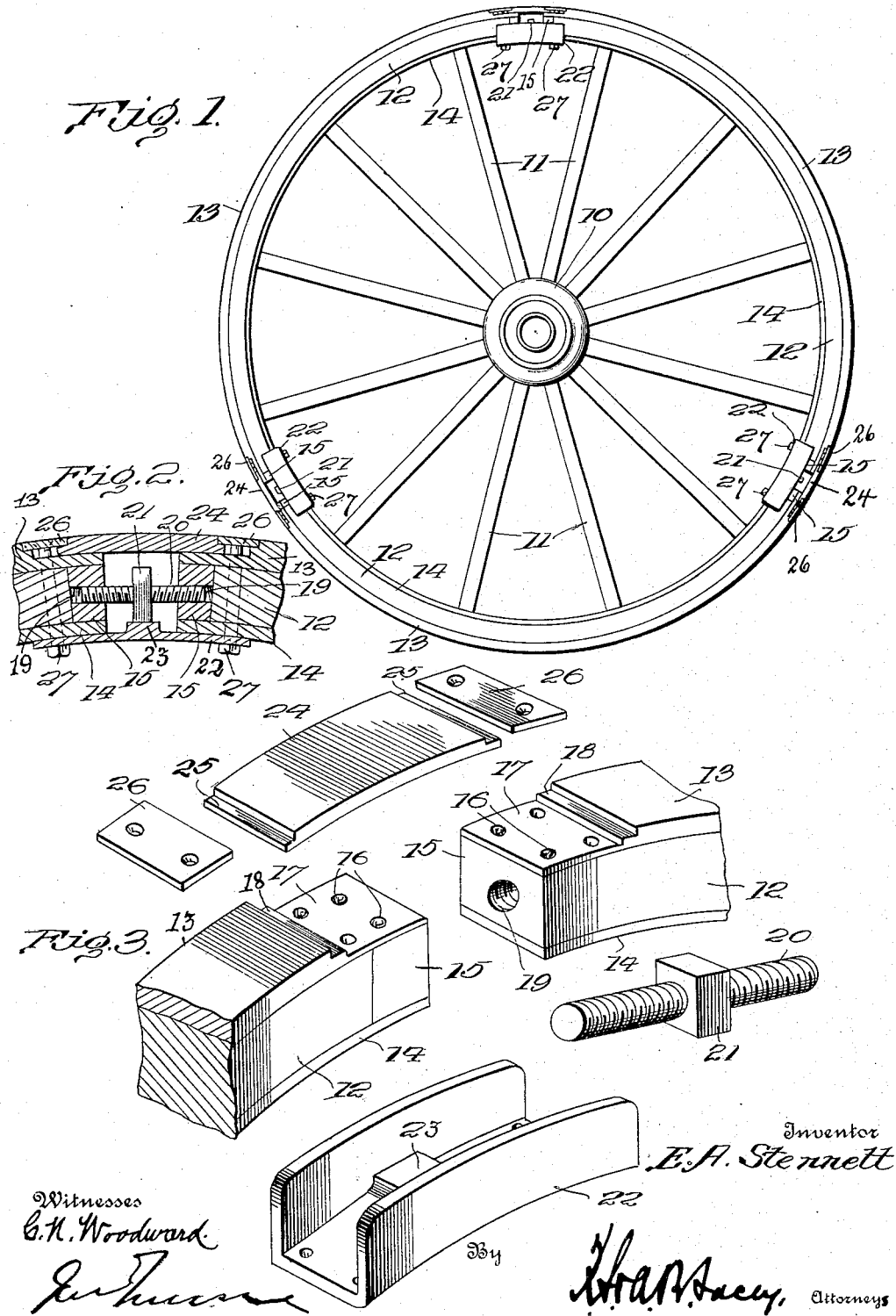

EDWARD A. STENNETT, OF RED OAK, IOWA.

ADJUSTABLE WHEEL, FELLY, AND TIRES.

1,172,639.  Specification of Letters Patent.  Patented Feb. 22, 1916.

Application filed February 2, 1915. Serial No. 5,705.

*To all whom it may concern:*

Be it known that I, EDWARD A. STENNETT, a citizen of the United States, residing at Red Oak, in the county of Montgomery and State of Iowa, have invented certain new and useful Improvements in Adjustable Wheels, Fellies, and Tires, of which the following is a specification.

This invention relates to improvements in wheels, more particularly to the class of expansion tire wheels, and has for one of its objects to simplify and improve the construction and increase the efficiency and utility of a device of this character.

Another object of the invention is to provide a simply constructed device, whereby any person, without previous skill or knowledge, can contract the tire of a wheel when the latter becomes loosened in dry weather or from other causes.

With these and other objects in view, the invention consists in certain novel features of construction as hereinafter shown and described and then specifically pointed out in the claim; and in the drawings illustrative of the preferred embodiment of the invention Figure 1 is a side elevation of a conventional wheel with the improvement applied; Fig. 2 is an enlarged sectional detail, illustrating the construction of the improved device; Fig. 3 is a view of the improved device in perspective and separated.

Corresponding and like parts are referred to in the following description and indicated in all the views of the drawings by the same reference characters.

The hub and spoke portion of the improved wheel are of the usual construction and are represented, respectively, at 10 and 11. The felly portion of the improved wheel is formed in a plurality of segmental sections and each section provided with an outer tire member and an inner tire member, but as the felly sections are precisely alike, a description of one will suffice for each. The wood portion of the felly section is indicated at 12, the outer tire member of each felly section at 13, and the inner tire member of each felly section at 14. The tire sections 13—14 project at the ends beyond the terminals of the felly sections 12, and disposed between the projecting ends of the tire members and against the terminals of the felly sections are block-like devices 15, and secured in any suitable manner between the projecting terminals of the tire members, preferably by riveting, as represented at 16. At their terminals, the outer tire members 13 are recessed, as shown at 17 and with a shoulder 18 at the juncture of the recess and the body of the member 13, the object to be hereafter more fully explained.

The block devices 15 are each formed with a threaded aperture, indicated at 19, the threads of the apertures of each pair of the confronting blocks being right and left handed. The threaded apertures are designed to receive a threaded bolt, represented as a whole at 20, the threads of the bolt being right and left handed, and each bolt provided with a wrench receiving enlargement 21, preferably square as shown. By this simple means, it will be obvious that when the bolt 20 is rotated by a wrench applied to the enlargement 21, the felly sections will be drawn toward each other, and the felly and its tire members tightened. Bearing within the recesses 17 of the members 18, are bridging plates 24 having shoulders 25 at their ends corresponding to the shoulders 18 of the members 13. Bearing on the shoulders 18—25, are clamp members 26 and secured by bolts or like fastening devices 27.

Engaging over the confronting ends of each of the tire members 13—14 and the blocks 15, is a cover device formed in U-shape transversely and represented at 22 and secured to the felly portions 12 by the same devices 27 which secure the clamp members 26. The bottom member of the cover device 22 is designed to bear against the wrench receiving enlargement 21 and prevent its retrograde movement, the member 22 being preferably provided with a projection 23 to engage the enlargement 21, as shown.

A plurality of the clamp members 26 will be provided of varying lengths, or relatively long members 26 may be first provided, and then after the bolt 20 has been manipulated to produce the requisite strain upon the felly and tire sections, the members 26 will be cut to fit between the shoulders 18—25, as illustrated in Figs. 1 and 2 and thus complete the outer tire and obviate the formation of gaps therein.

The improved device is simple in construction, can be inexpensively manufactured and applied, and does not add materially to the expense of the wheel, while at the same time enabling the owner of the vehicle to maintain the tires in complete and perfect operative conditions under all circumstances of weather and the roadway over which the vehicle is operated.

Having thus described the invention, what is claimed as new is:

A wheel including a divided outer tire and a divided inner tire united at their ends, a divided felly disposed between said outer and inner tires, and means for drawing said tires and the felly members supported thereby toward each other.

In testimony whereof I affix my signature in presence of two witnesses.

EDWARD A. STENNETT.

Witnesses:
WM. MERCER,
F. O. EVERETT.

Copies of this patent may be obtained for five cents each, by addressing the "Commissioner of Patents, Washington, D. C."